United States Patent [19]
Rowe

[11] Patent Number: 4,573,282
[45] Date of Patent: Mar. 4, 1986

[54] FISHING LURE
[76] Inventor: Lacy A. Rowe, 1851 Skycoe Dr., Salem, Va. 24153
[21] Appl. No.: 596,381
[22] Filed: Apr. 3, 1984
[51] Int. Cl.[4] ............................................. A01K 85/00
[52] U.S. Cl. .................................................. 43/42.15
[58] Field of Search ................. 43/42.03, 42.11, 42.15, 43/42.02

[56] References Cited
U.S. PATENT DOCUMENTS

| | | | |
|---|---|---|---|
| 1,477,756 | 12/1923 | Heddon | 43/42.15 |
| 1,545,683 | 7/1925 | Nowak | 43/42.15 |
| 1,581,833 | 4/1926 | Bonnett | 43/42.15 |
| 1,828,574 | 10/1931 | Neukam | 43/42.15 |
| 1,833,522 | 11/1931 | Goble | 43/42.13 |
| 2,244,032 | 6/1941 | Timm | 43/26.2 |
| 2,627,136 | 2/1953 | Sinclair | 43/42.15 |
| 2,700,239 | 1/1955 | Ellis | 43/42.15 |
| 2,726,473 | 12/1955 | Kuslich | 43/42.15 |
| 2,789,385 | 4/1957 | Seeger | 43/42.15 |
| 3,172,227 | 3/1965 | Mackey | 43/42.09 |
| 3,284,944 | 11/1966 | Settle | 43/42.15 |
| 3,313,058 | 4/1967 | Fuerst | 43/42.15 |

FOREIGN PATENT DOCUMENTS 264908  9/1968  Austria ............................. 43/42.15

Primary Examiner—Gene P. Crosby
Attorney, Agent, or Firm—Munson H. Lane, Jr.

[57] ABSTRACT

An articulated fishing lure is comprised of at least a front and a tail section which are connected with minimum longitudinal separation between sections for oscillation of the tail section relative to the front section to simulate the action of an injured minnow. The front of the tail section is hollowed and the point of articulation of the tail section to a drawbar fixed to the rear of the front section and extending rearwardly therefrom in an axial direction is between the front edge and centroid of the tail section. The rear end of the front section is hollowed to permit freedom of oscillation of the tail section relative to the front section while maintaining minimum longitudinal separation between sections.

11 Claims, 9 Drawing Figures

FISHING LURE

BACKGROUND OF THE INVENTION

1. Field of Invention

This invention relates in general to fishing lures and more particularly to fishing lures comprised of at least front and tail sections which are articulated in such a way that when the lure is pulled through water, the tail section will oscillate relative to the front section in a manner simulating the action of an injured minnow.

The action of an injured minnow as it moves through water includes a large amount of tail action relative to its forward motion. A fish observing the motion of the injured minnow recognizes it as easy prey and will attack it. It is therefore an object of this invention to provide a fishing lure which will simulate as close as possible the action of an injured minnow.

2. Discussion of the Prior Art

There are many articulated fishing lures disclosed in the patent literature, however, none of which applicant is aware disclose a fishing lure having the improved features of the present invention which are described and claimed herein.

SUMMARY OF THE INVENTION

It is an object of this invention to provide an improved articulated fishing lure which simulates the action of an injured minnow as it is pulled through water by a fishing line. The simulation of an injured minnow is the result of the tail section of the lure having a large amount of swinging action relative to forward motion of the lure as the lure is pulled through a body of water.

It is another object of the invention to provide an articulated fish lure which generally simulates the shape of a minnow and which has at least front and tail (trailing) sections which are pivotally connected with only slight longitudinal separation between the sections, the front section being open and hollow at its rear end to permit the front end of the trailing section to swing within the hollow space at the rear end of the front section, the trailing section being open and hollow at its front end, the adjacent sections being connected by a drawbar fixed in the rear end of the front section and extending rearwardly and generally axially therefrom beyond the rear end of the front section and into the hollow end of the tail section for a predetermined distance, the drawbar being pivotally connected with pivot means mounted in the front portion of the tail section for swinging motion of the tail section about a pivot which is located between the front of the tail section and the centroid thereof.

BRIEF DESCRIPTION OF THE DRAWINGS

With the foregoing more important objects and features in view and such other objects and features which may become apparent as this specification proceeds, the invention will be understood from the following description taken in conjunction with the accompanying drawings, in which like characters of reference are used to designate like parts, and in which.

DETAILED DESCRIPTION OF THE PREFERRED EMBODIMENT

Figure 1:
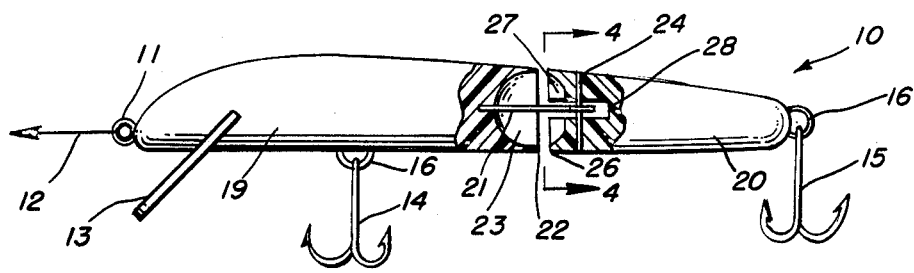
FIG. 1 is a side elevational view of one form of the invention, partly in longitudinal section, showing the general construction thereof.

Referring to the drawings, and particularly to FIGS. 1 to 4, a preferred embodiment of the articulated fishing lure of this invention is generally indicated by the numeral 10. The fishing lure 10 is generally shaped to simulate a minnow and has the usual appendages common to conventional fishing lures, including an attaching eye 11 at the nose of the lure for the attachment of a fishing line, or leader 12, a baffle 13 inset in the bottom front portion of the lure and inclined in a downward and forward direction, and a pair of fish hooks 14 and 15 connected by eyelets 16 to the bottom of the lure and to the trailing end of the lure respectively.

The overall shape of the lure as seen from a top view (shown in FIG. 2) is generally elliptical, with side edges curved smoothly from an area of maximum body width just forward of midsection toward narrow front and tail ends 17 and 18 respectively. The lure 10 has front and tail sections 19 and 20 which are pivotally connected by a drawbar 21, fixed in the rear end portion of the front section and extending generally axially and rearwardly therefrom for a predetermined distance beyond the rear end 22 of the front section, and a vertically oriented pivot pin 24 secured in the tail section 20 and extending through an opening 25 formed in the rear end of the drawbar.

The ends 22 and 26 of the sections 19 and 20 lie in parallel transverse planes which are perpendicular to the longitudinal axis of the lure 10. The space 29 separating the two ends 22 and 26 is just sufficient to allow working clearance between the sections 19 and 20. With the tail section 20 axially aligned with the front section 19, the front section serves as a shield to divert water around the tail section as the lure is pulled through water.

Figure 2:
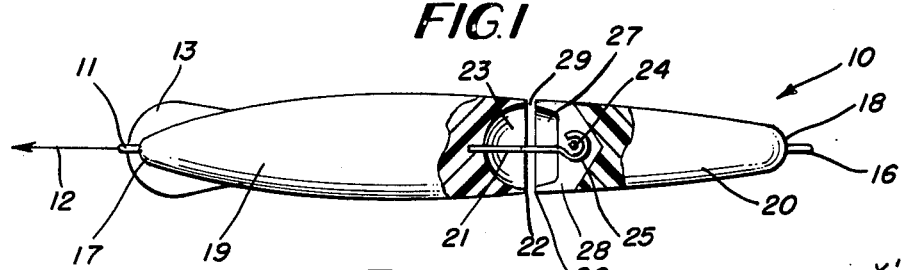
FIG. 2 is a top plan view of the fishing lure shown in FIG. 1, partly in longitudinal section.

As observed in both FIGS. 1 and 2, the tail section 20 continues the rearward tapered contour of the rear end of the front section 19 without any offset. Each of the lure sections 19 and 20 are preferably made of solid material, such as plastic or other suitable material. A generally cupped or hemispherical cavity 23 is provided in the rear end of the front section for receiving the front end of the tail section with sufficient clearance so that the tail section can swing freely about its pivotal connection with the front section.

The front end of the tail section 20 is provided with a generally cupped or concave cavity 27 extending inwardly from the front end 26. A narrow slot 28 is formed in the tail section and extends from the front end 26 thereof past the pivot pin 24 in a generally longitudinal and horizontal direction. The slot 28 is centered along the axis of the drawbar 21. The purpose of the slot 28 is to permit a wide range of angular motion of the tail section 20 relative to the front section 19.

In considering the operation of the fishing lure 10, it should be remembered that important features of the invention which contribute to its function in simulating the action of an injured minnow are the location of the pivot pin 24 at a position along the longitudinal axis of the tail section which is between the centroid of the tail section 20 and the front end 26 of the tail section, and the cup shaped cavity 27 in the front end of the tail section.

Suppose that only the tail section 20 was pulled through water by a line tied at the pivot point where the drawbar 21 is hinged to pivot pin 24, the tail section would not pull in straight alignment with the line, rather it would be pulled sidewise without articulated motion similar to a dead stick when hooked in its mid section.

Also, if the front section 19 only (without the tail section) is pulled by a string attached to the eye 11, the front section would swing with greater amplitude than when loaded with a rear section attached as a drag. By designing the tail section to also have self generating capabilities to swing, the front section is relieved of the work to be done upon the rear section.

At the start of pulling the lure 10, when both sections 19 and 20 are in alignment, the overall length of the lure is at maximum. When at the maximum amplitude of articulation, the overall length of the lure is a minimum. Therefore, each of the two sections 19 and 20 must have rotated about an axis—one rotating clockwise while simultaneously the other section rotates counterclockwise.

It is the amount of rotation of the tail section relative to the forward motion of the lure as a whole which simulates a minnow in distress. A healthy live minnow generates a favorable amount of thrust moving it forward relative to tail motion, however, a minnow in distress expends a disproportionate amount of tail energy relative to resultant forward motion. The smooth, controlled motions of a healthy minnow, or lure, does not exemplify a crippled minnow which presents an easy meal for a fish.

The cupped or concave front cavity 27 in the tail section 20, when it is exposed by movement of the tail section out of alignment with the front section 19, is subject to water forces resulting from forward motion of the lure through water. The water forces action on the side of the cavity 27 which is exposed or unshielded by the front section causes the tail section to accelerate toward its position of maximum angulation relative to the front section. The tail section would remain in its position of maximum angulation, except that the pulling force of the line 12 attached to the nose of the lure is always trying to pull the lure in a straight line. In order that the tail section will not remain in its position of maximum angulation, it is necessary to locate the pivot pin 24 forward of the centroid of the tail section 20.

Figure 3:
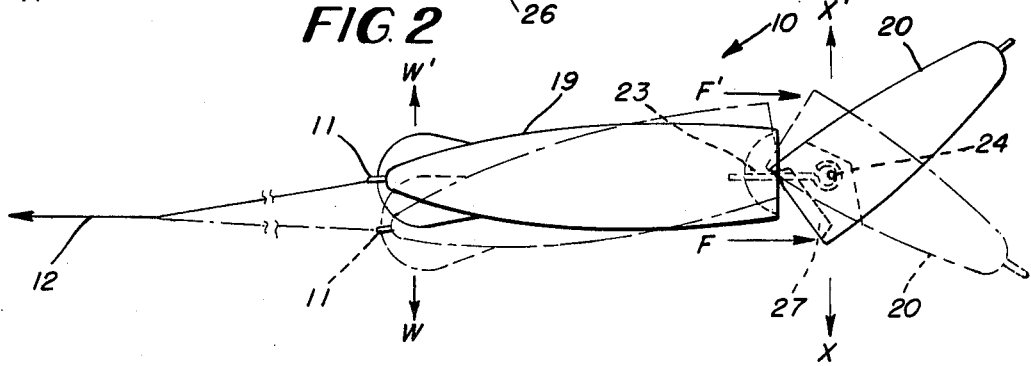
FIG. 3 is a top plan view of the fishing lure of FIG. 1 showing in solid lines the angled relationship of the front and tail sections of the lure as it is pulled by a line attached to the nose of the front section in one phase of oscillation, and showing in dotted lines the angular relationship of the front and tail sections in another phase of oscillation.
Figure 4:
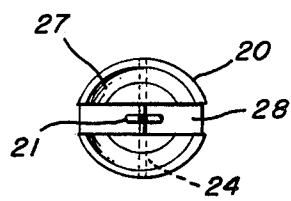
FIG. 4 is a cross-sectional view taken on line 4—4 of FIG. 1.

Referring to FIG. 3, which shows the lure 10 in top plan view, as the lure's front section 19 rotates clockwise in the direction W, under inducement of water against the front lip 13, the hinge pin 24 moves in the direction X causing the tail section 20 to rotate counterclockwise. As the two sections 19 and 20 rotate simultaneously in opposite directions, one side of the front cavity 27 in the tail section becomes exposed to water force F, creating an impedance to the flow of water past the tail section. The water force F accelerates the rotation of the rear section 20 counterclockwise. This acceleration will continue until the front section has rotated sufficiently toward W' to cause the line pull to induce counterclockwise rotation of the front section back to alignment with the line 12. This causes the tail section to be forced out of its almost locked jackknife position into clockwise rotation. As the front of section 19 swings in the direction W, the pivot pin 24 moves toward X'. The tail section 20, now moving clockwise, has the right side of its front cavity 27 exposed to the water force F', which force accelerates clockwise motion of the tail section. This acceleration will continue until the front section 19 has rotated sufficiently toward W to cause the line pull to induce clockwise rotation of the front section back to alignment with the line 12. The tail section 20 is now forced out of its almost locked jackknife position (as seen in dotted lines in FIG. 3) and will begin counterclockwise rotation again. The rotation of the two sections 19 and 20 in opposite directions as described above will continue in repeated cycles as long as the lure 10 is being pulled by line 12.

The difference between the action of the lure 10 and conventional articulated lures which are hinged at a point intermediate front and rear sections rather than at a point between the front and centroid of the rear section will be further explained by reference to FIGS. 5 and 6.

Figure 5:
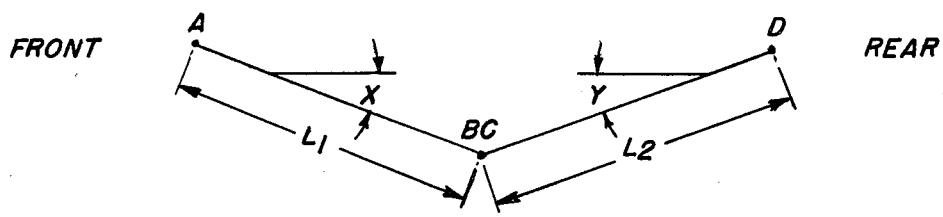
FIG. 5 is a diagramatic view of a conventional articulated fishing lure.

FIG. 5 is a diagramatic view of a conventional articulated lure. The lines AB and CD represent front and rear sections respectively of an articulated lure with the points BC coinciding and representing the pivot axis between the two sections. The distance $L_1$ represents the length of section AB; the distance $L_2$ represents the length of section CD. Section AB makes an angle x with the horizontal, and section CD makes an angle y with the horizontal.

When the lure represented in FIG. 5 is in the configuration shown, the angle y equals $x \cdot L_1/L_2$.

For example, when $x=5°$, and $L_1=L_2$, then $y=5°$.

Figure 6:
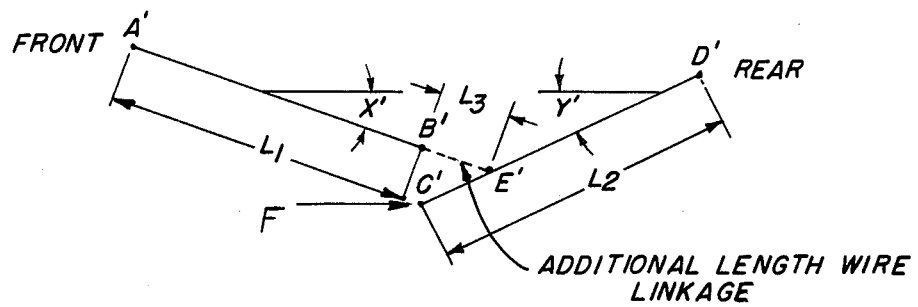
FIG. 6 is a diagramatic view of the fishing lure shown in FIG. 1 and angled as shown in solid lines in FIG. 3.

FIG. 6 is a diagramatic view of the lure 10 of this invention. The lines A'B' and C'D' represent the front and rear sections 19 and 20 of lure 10. The dotted line B'E' represents drawbar 21 of lure 10, and the point E' represents the pivot point 24 of lure 10 between the front C' and centroid of the tail section. Section A'B' is of length $L_1$, section C'D' is of length $L_2$ and the drawbar B'E' is of length $L_3$. x' and y' are the angles which A'B' and C'D' make with the horizontal.

When the lure represented in FIG. 6 is in the configuration shown, $$y' = x'\left(\frac{L_1 + L_3}{L_2 - L_3}\right)$$

For example, when $x'=5°$, $L_1=L_2$, and $L_3=\frac{1}{4}$ of $L_2$, then $$y' = 5\left(\frac{1 + 0.25}{1 - 0.25}\right) = 8.3°.$$

The resultant linkage $L_3$ becomes a multiplier of 8.3/5.0 or 1.66.

When the two sections A'B' and C'D' are in alignment, point C' becomes congruent in configuration with the body of the front sections A'B'. In the aligned configuration of sections A'B' and C.'D', the water forces F acting upon the cupped cavity 23 at the front of lure 10 is zero. When the front and rear sections are not in alignment, point C' is out of alignment with the front section and the water force F is utilized on one side of the cupped cavity 27, while simultaneously the opposite side of the cavity 27 is completely shielded from water forces.

Taking into consideration the linkage multiplier and water force, the following applies:

$$y = x\left(\frac{L_1 + L_3 + F'}{L_2 - L_3}\right) ;$$

where $F'$ is defined to be the resultant water force F in terms of equivalent length of lever advantage.

When $L_3+F'$ is greater than one-half of $L_2$, the lure 10 will mechanically lock in a "jack-knife" position ceasing articulation.

EXAMPLE

Assume that the water forces F on the front section lip or baffle 13 and on the rear section cupped end are equal.

$F'$, as defined above must be less than $\frac{1}{2} L_2 - L_3$ to assure continuous controlled articulation. If $F'$ is designed at ninety percent of total allowable, then $$F' = .9 [(\tfrac{1}{2}) (L_1) - L_3]$$
$$= .9 [(\tfrac{1}{2}) (1) - \tfrac{1}{4}*] = .225$$

*$L_3$ value used is as previously assumed to maintain comparable results. The total possible design mechanical linkage equivalent to induce total rear section possible rotation $$y = x\left(\frac{L_1 + L_3 + F'}{L_2 - L_3}\right) .$$

Assuming the value of x to be 5° and $l_1=L_2$ again, then $$y = (5)\left(\frac{1 + .25 + .225}{1 - .25}\right)$$

$$= (5)\left(\frac{1.475}{.75}\right) = 9.8°.$$

The mechanical advantage would be 9.8°/5° or 1.96 to 1 relative to conventional prior art lures which have front and rear sections pivoted between their respective ends.

In the present invention, the proximity of the front and rear sections should only allow for working clearance to minimize drag induced by the water as eddy currents and to optimize shielding of the rear section by the front section.

The present invention is not limited to an articulated lure with only two sections as in FIGS. 1–4. The principles of this invention are applicable to lures of two or more sections.

Figure 7:
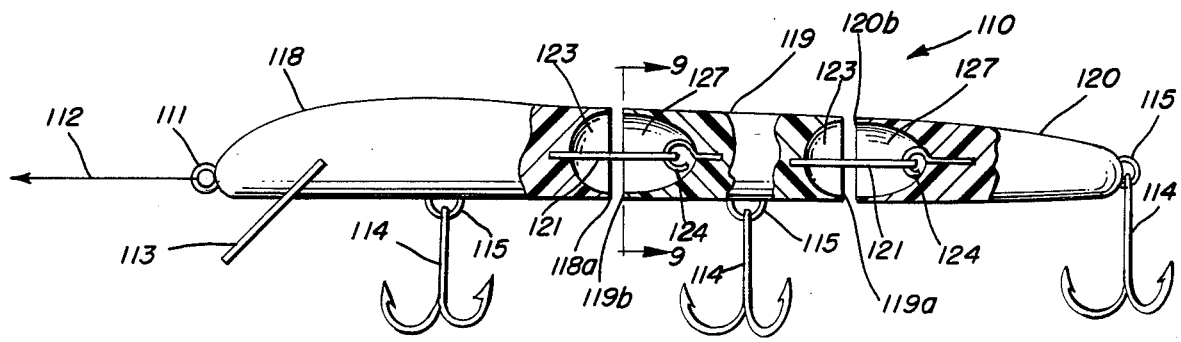
FIG. 7 is a side elevational view, partly in section, of another form of the invention.
Figure 8:
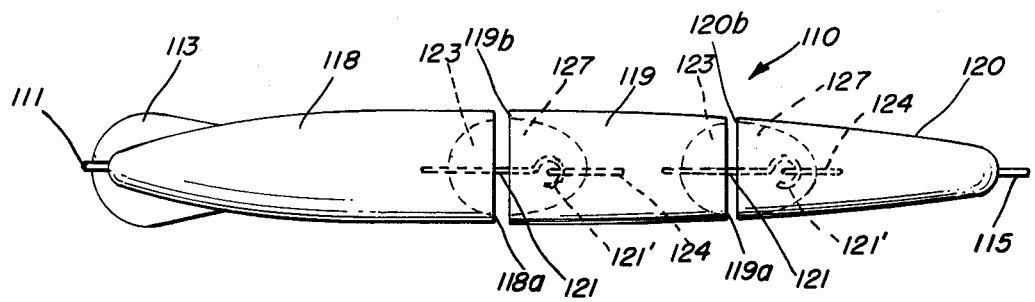
FIG. 8 is a plan view of the fishing lure shown in FIG. 7.
Figure 9:
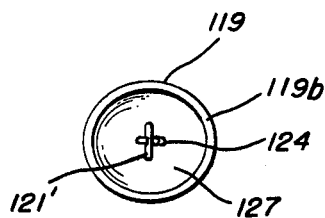
FIG. 9 is a sectional view taken on line 9—9 of FIG. 7.

A lure 110 having features similar to lure 10 of FIGS. 1–4, but comprised of three articulated sections 118, 119 and 120, instead of two, is illustrated in FIGS. 7–9. The lure 110 has an overall shape similar to the lure 10, however, it is more elongated. A line 112 is connected to an eyelet 111 at the front of the lure. Multiple fish hooks 114 are attached at different points along the length of the lure by eyelets 115, and a baffle or lip 113 is inset in the bottom of the front section 118 near the front similar to the baffle 13 of lure 10.

The front section 118 and the intermediate section 119 each have cupped, generally hemi-spherical cavities 123 extending inwardly from their open rear ends 118a and 119a respectively. The intermediate section 119 and the tail section 120 each have a cupped, generally concave cavity 127 extending inwardly from their open front ends 119b and 120b respectively. Drawbars 121 fixed in the rear ends of sections 118 and 119 within rear cavities 123 and extending rearwardly therefrom are pivotally connected to eyelets 124 secured in the bodies of sections 119 and 120 within their front cavities 127. The drawbars 121 each have a hooked end 121' lying in a horizontal plane which engages an eyelet 124 lying in a substantially vertical plane. The pivotal connections between section 118 and its trailing section 119 and between section 119 and its trailing section 120 are located adjacent the bottom of cavities 127, substantially to the rear of the front ends 119b and 120b of the sections 119 and 120 respectively and forward of the centroids thereof.

The action of each of the trailing sections 119 and 120 of the lure 110 relative to the respective leading sections 118 and 119 to which they are articulated corresponds generally with the action of the tail section 20 relative to the front section 19 of the lure 10.

The term centroid as used herein means the resultant vertical axis each body section of the lure would rotate about when disjointed so as to be independent of the other body section (sections). Expressed another way, it is the observed axis of rotation of each section if the respective section singularly were held steady on a line in water flowing sufficiently to cause articulation of the section.

The optimum location of the hinge or pivot point between the lure sections relative to the centroid of the trailing section is forward of the trailing section's axis rotation (centroid) sufficient to maintain continuous oscillation of the trailing section relative to the leading section. Referring to FIG. 6, the optimum location of the pivot point E' would be where $F'+L_3$ is almost equal to but less than the distance between the front end of the trailing section and the centroid. ($F'$ being previously defined.)

The body sections of the lure of this invention will be made of lightweight composite bouyant material as well as composite material heavier than water.

While in the foregoing there has been described and shown a preferred embodiment of the invention, various modifications and equivalents may be resorted to within the spirit and scope of the invention as claimed.

What is claimed is:

1. An articulated fishing lure for simulating an injured minnow when pulled through water comprising at least a leading body section of substantially equal mating diameter and a trailing body section articulated to said leading body section, said leading body section having a front end and a rear end, a first cupped cavity of circular shape extending axially inwardly from the rear end of said leading body section into said leading body section, said trailing body section having a front end and a rear end, a second cupped cavity of circular shape extending axially inwardly from the front end of said trailing section into said trailing body section, a drawbar axially fixed in said leading body section adjacent the bottom of said first cupped cavity and extending rearwardly from said leading body section beyond the rear end thereof and into said second cavity and pivot means within said second cavity for pivotally connecting said drawbar to said trailing body section, said pivot means having a pivot point located between the front end of the trailing section and the centroid of said trailing section, said pivot point being located substantially to the rear of said front end of said trailing section and sufficiently forward of said centroid to prevent said lure from mechanically locking in a jack-knife position when pulled through the water, said first and second cupped cavities being of a size and shape to permit the front end of said trailing section to swing freely to either side within said first cupped cavity.

2. The lure of claim 1 wherein said pivot means includes a vertical pivot pin secured in said trailing section, and said drawbar has an aperture at its extended end through which said pivot pin extends.

3. The lure of claim 2 wherein said trailing section has an axially extending horizontal slot formed therein, said slot extending therethrough from opposite sides and rearwardly from the front end of said trailing section to just beyond said vertical pivot pin.

4. The lure of claim 1 wherein said articulated leading and trailing body sections are of complementary shapes simulating the shape of a minnow.

5. The lure of claim 1 wherein said first cupped cavity in said leading body section is shaped to receive therein without interference the front of said trailing body section as it pivots relative to said leading body section.

6. The lure of claim 5 wherein said articulated leading and trailing body sections are separated by the minimum longitudinal distance sufficient to provide clearance between said leading and trailing body sections as they pivot relative to each other.

7. The lure of claim 1 wherein a connecting means is secured at the front end of said lure for connecting a fishing line to the lure, and wherein at least one fish hook is pivotally connected to said lure.

8. The lure of claim 1 wherein a downwardly and forwardly inclined baffle projects beneath the front end portion of said leading body section.

9. The lure of claim 1 wherein the lure has three articulated body sections including a front body section, an intermediate body section and a rear body section, said front body section and said intermediate body section forming one pair of leading and trailing body sections respectively, and said intermediate and said rear body sections forming a second pair of leading and trailing body sections.

10. The lure in claim 1 wherein the rear of the front section provides an optimum shield from flow-by water onto the front of the rear section at a time only when the sections are in longitudinal axial alignment.

11. The lure in claim 1 wherein alternately one side of the front of the rear section becomes mechanically unshielded when the two sections are not in longitudinal alignment, causing the flow-by water so obstructed to actively induce additional rotation on the rear section or sections.

* * * * *